May 3, 1955

D. W. MOLINS 2,707,630

APPARATUS FOR WEIGHING ARTICLES IN SUCCESSION
AND INDICATING VARIATIONS IN THE
WEIGHTS OF THE ARTICLES

Filed May 1, 1951

INVENTOR
Desmond W. Molins

BY
Watson, Cole, Grindle &
Watson
ATTORNEYS

May 3, 1955

D. W. MOLINS 2,707,630

APPARATUS FOR WEIGHING ARTICLES IN SUCCESSION
AND INDICATING VARIATIONS IN THE
WEIGHTS OF THE ARTICLES

Filed May 1, 1951

INVENTOR
Desmond W. Molins

BY
Watson, Cole, Grindle
& Watson
ATTORNEYS

United States Patent Office 2,707,630
Patented May 3, 1955

2,707,630

APPARATUS FOR WEIGHING ARTICLES IN SUCCESSION AND INDICATING VARIATIONS IN THE WEIGHTS OF THE ARTICLES

Desmond Walter Molins, London, England, assignor to Molins Machine Company Limited, London, England, a British company Application May 1, 1951, Serial No. 223,924

Claims priority, application Great Britain May 4, 1950

5 Claims. (Cl. 265—27)

This invention concerns improvements in or relating to apparatus for weighing articles in succession and indicating variations in the weights of the articles.

It has previously been proposed to provide weighing mechanism for weighing cigarettes taken from the output of a cigarette making machine, and to regulate the tobacco feeding mechanism of the machine according to variations in the weights of the cigarettes so weighed. In some prior arrangements the weighing mechanism was provided with an arm connected to the weigh-beam so as to swing with the latter, and a detector device comprising a feeler, and on completion of a weighing operation, when the weigh-beam came to rest the feeler was caused to move into engagement with a plate, carried by the arm, which was suitably stepped so as to allow the feeler to move different distances according to the position of the arm and hence according to the amount of deflection of the weigh-beam. The movement of the feeler was utilised to actuate mechanism which caused variations in the rate of feed of tobacco according to the variations in the weight of the cigarettes. One such proposal is disclosed in United States Patent No. 2,083,173, in which the detector device comprises a pair of feelers, and the arm on the weigh-beam swings to one side or the other of a central position, according to whether the cigarettes weighed are too heavy or too light, so that one feeler or the other is enabled to move according to the position of the arm. The plate on the arm in that case is stepped on both sides, so that the distance a feeler can move is determined by the amount of deflection of the weigh-beam in response to a weighing operation, and hence by the amount by which the weight of the cigarettes varies from the normal or desired weight, and the rate of feed of tobacco by the tobacco feeding mechanism is varied accordingly.

A disadvantage of these earlier arrangements is that as the arm is fixed to the weigh-beam and swings with the latter, the inertia of the weigh-beam is increased and there is a consequent increase in the time taken by the weigh-beam to come to rest during each weighing operation. Since it is desirable that any variation from normal in the weight of cigarettes being produced on the machine should be corrected as quickly as possible after the variation has been detected by weighing, it is important that the interval between the weighing and the operation of the feeler whose movement initiates correction of the tobacco feed should be as short as possible. Hence any undue delay between the commencement of a weighing operation and the actuation of the detector device is to be avoided as far as possible.

According to the present invention there is provided apparatus for weighing articles (e. g. batches of cigarettes) in succession, and detecting variations in the weights of said articles, comprising a pivoted weigh-beam and detector-means co-operating therewith, the said detector-means comprising a pivoted member (e. g. a double-armed lever) adapted to be swung into contact with a stop surface on the weigh-beam and at least one feeler or the like adapted to be moved to engage a part of said pivoted member when the latter is in contact with the said stop, and movable a distance determined by the angular position of the said pivoted member, the latter position being determined by the angular position of the weigh-beam.

The pivoted member is preferably arranged so that the part engaged by the feeler is a greater distance from the pivot centre of said member than is the part of the member which contacts the said stop, whereby the part engaged by the feeler can move relatively large distances in response to relatively small distances moved by the stop. For example, where the pivoted member consists of a double-armed lever, a short arm of the lever may be arranged to swing into contact with the stop, and a longer arm comprises the part engaged by the feeler. The stop may be located near or at one end of the weigh-beam.

Means may be provided to prevent further pivotal movement of the weigh-beam after the latter has come to rest in a weighing operation, so as to hold the weigh-beam and the said stop against movement when the stop is engaged by the pivoted member.

Means (e. g. a spring) may be provided to urge the pivoted member into contact with the stop, and control means may be provided to move the pivoted member away from the stop and to restrain it from swinging towards the stop except at desired times.

The apparatus may comprise means actuated by the movement of the said feeler to cause variations in the operation of further mechanism (e. g. to vary the rate of feed of tobacco in a cigarette-making machine) in accordance with variations in the weights of different articles (e. g. batches of cigarettes) weighed.

Apparatus in accordance with the invention will now be described by way of example with reference to the accompanying drawings in which.

Figure 1:
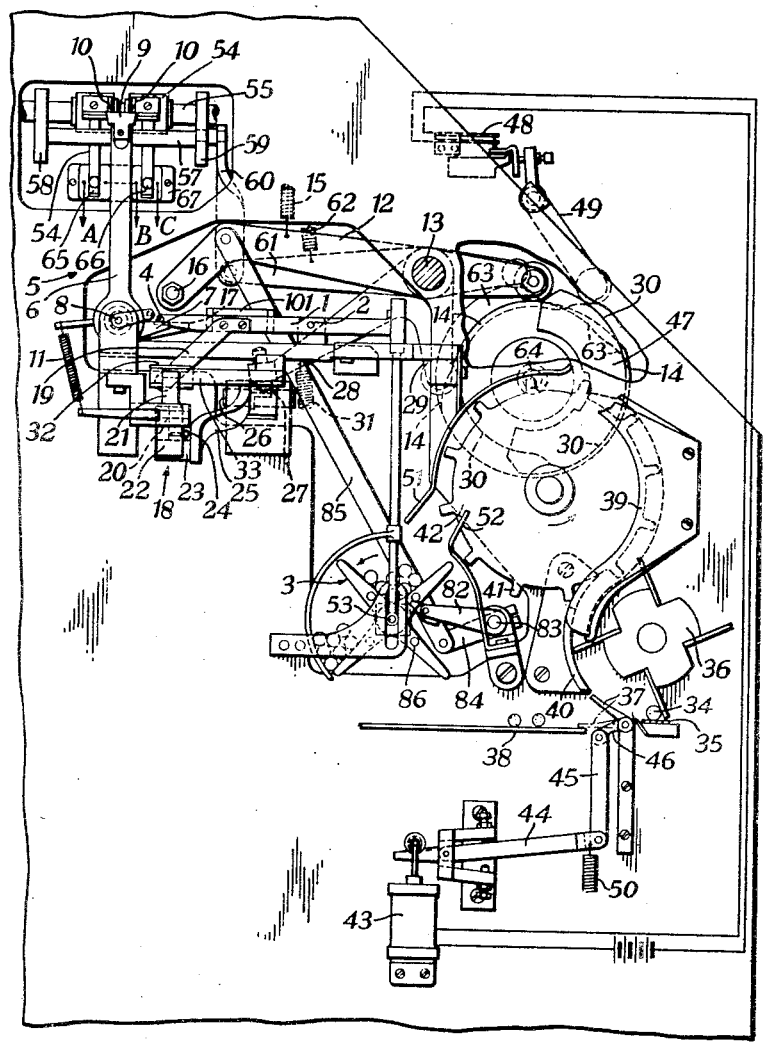
Figure 1 is a view of part of the end of a cigarette-making machine showing the apparatus fitted thereto.

The apparatus illustrated is for use with a cigarette-making machine and is adapted to control the tobacco feeding mechanism of the machine by regulating the rate of feed according to variations in the weight of cigarettes produced. Batches of cigarettes issuing from the machine are deflected into the scale pan of a weighing mechanism, each batch consisting of a predetermined number of cigarettes, and if the weight of a batch varies from the normal or desired weight, the variation is detected and the rate of feed of tobacco is varied. As shown the apparatus causes the feed to be increased or decreased when the cigarettes differ from the desired weight by more than a certain amount.

The weighing mechanism comprises a weigh-beam 1, pivoted at 2 on a taut wire, to which is fixed, at the end remote from the scale pan 3, a hardened steel pin 4 which constitutes a stop which swings with the weigh-beam when the latter is deflected during weighing.

Located near the weigh-beam is a pivoted member 5 formed as a double-armed lever with arms 6 and 7 and pivoted at 8 so as to be capable of swinging towards and away from the stop 4. The arm 7 of the double-armed lever is relatively short and arranged to move into contact with the stop when the lever is swung in one direction. The other arm of the lever is longer, and has fixed at its end a plate 9 which is suitably shaped to be engaged by one or both of a pair of feelers 10 arranged automatically to move down at intervals for this purpose. The feelers are mounted above the plate, and the arrangement is such that when the longer arm 6 of the double-armed lever is in a predetermined position, that is, the weight is within the tolerance allowed, both the feelers on moving down will engage the plate, and will thereby be prevented from further movement. If on the other hand the arm 6 is in a position to one side or the other of the predetermined position just mentioned, one or the other of the feelers will be able to move down on one side of the plate while the other will engage the plate.

The double-armed lever 5 is spring-urged by a spring 11 to swing in a direction such as to bring the shorter arm 7 into contact with the stop 4 on the weigh-beam 1. Automatic control-means comprising suitable cam mechanism, now to be described, is provided to control the movement of the lever so as to restrain it from swinging towards the stop on the weigh-beam except at predetermined times, when the control-means operates to allow the lever to swing over a distance determined by the position of the stop, and subsequently operates to swing the lever back away from the stop.

This control means comprises a cam lever 12 pivoted at 13 and moved up and down on its pivot by a cam 14 and spring 15. One end of the cam lever has a pin 16 on it adapted to engage an arm 17 movable with the pivoted member 5. Thus when the pin 16 descends, the arm 7 is moved clear of the stop 4 and when the pin 16 ascends, the member 5 is free to move under the action of the spring 11 to cause the arm 7 to engage the stop 4.

Figure 2:
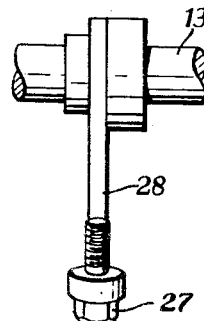
Figure 2 is a side elevation of part of Figure 1 showing a cam operated gripper.
Figure 2:
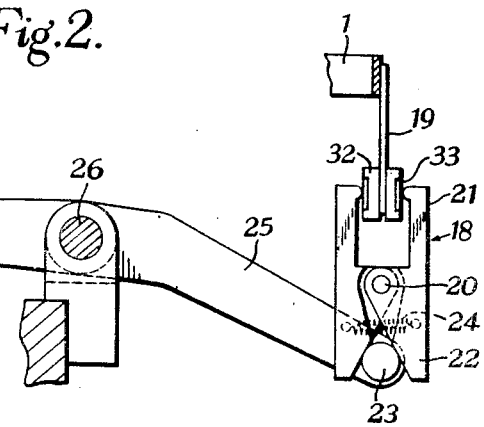
Figure 3:
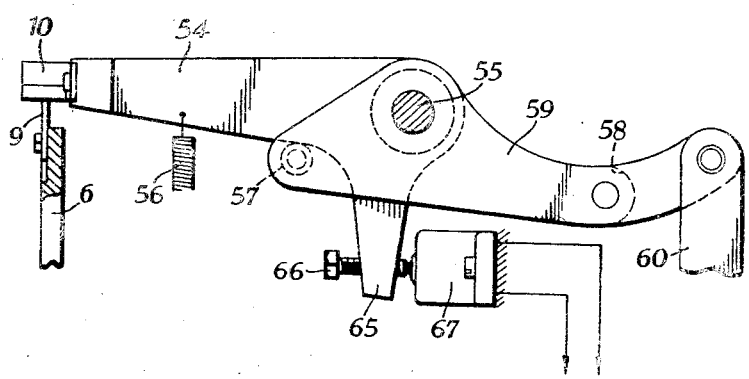
Figure 3 is a side elevation of part of Figure 1 showing feeler devices.

A locking or gripping device, generally indicated by the reference 18, is provided which is arranged automatically to engage a strip 19 fixed to the weigh-beam 1 as soon as the latter comes to rest in a weighing operation, and to grip it so as to prevent further pivotal movement of the weigh-beam during the time the stop 4 on the weigh-beam is engaged by the arm 7, of the double-armed lever. The construction of the gripper 18 is best seen in Figure 2 where it will be seen that two double-armed levers pivoted together at 20 have upper arms 21 which form the gripping elements or jaws, and lower arms 22 which have opposed sloping faces against which a pin 23 can be pressed to cause the gripper elements to close. A spring 24 tends to open the jaws. The pin 23 is fixed to one end of a lever 25 pivoted at 26 and having its other end engaged by a stud 27. This stud is fixed to a long arm 28 of a bell crank lever pivoted at 13 whose other arm 29 carries a roller which is engaged by a cam 30. A spring 31 pulls the roller against the cam 30. Thus as the cam 30 rotates, the gripper is caused to open and close its jaws. The gripper operates to press pads 32 which are supported on long spring strips 33 into gripping engagement with the strip 19. The remaining parts of the apparatus will be described in the following account of the operation.

The operation of the apparatus is as follows. Batches of cigarettes, each batch consisting of a definite number of cigarettes are periodically collected as they issue from the cigarette-making machine and each batch is delivered into the scale pan 3 of the weighing apparatus and weighed.

In the operation of the mechanism for causing batches of cigarettes to be deposited at intervals in the pan of the weighing machine, cigarettes 34 are deflected from the separating tape 35 of the cigarette making machine by the vanes of a rotary deflector 36. A small pivoted flap 37 which normally lies near to the catcher band 38 of the machine so that the cigarettes deflected from the cigarette rod line by the vanes of the deflector 36 may pass on to the catcher band is caused periodically to move into the position shown so that the cigarettes will be carried upwards by the vanes between guides 39 and 40 and delivered to compartments formed by projections 41 on a pair of rotating discs 42 from which they are delivered into the scale pan 3. The guide 39 consists of a pair of thin plates spaced apart a sufficient distance to clear the vanes of the deflector 36.

The flap 37 is operated by a solenoid 43 whose core is connected by a lever 44 and link 45 to a lever 46 on the flap spindle. The solenoid is energised at definite intervals by means of a cam segment 47, fixed to the cam 14, which operates a switch 48 through a pivoted lever 49. When the magnet 43 is energised by completion of the current by the switch 48, as shown, the flap is raised, and it is pulled down by a spring 50 when the magnet current ceases.

The cigarettes discharged from the rotating discs 42 are guided by guides 51 and 52 into the pan 3. The pan is formed as a wheel with four compartments and rotatable on a spindle 53 and in practice two of these contain seven cigarettes each, the result of two consecutive movements upwards of the flap 37. Seven cigarettes are shown in each of the said two compartments, one having been filled, as the result of a previous delivery and one having just received its complement of cigarettes. After a weighing has been made the pan wheel is rotated so that the first loaded compartment can discharge its cigarettes on to the catcher band leaving the other loaded compartment in position to provide half of the next batch to be weighed. The devices for rotating the pan will be described presently. Assuming that both compartments are provided with seven cigarettes each and the weighing has commenced, the weigh-beam 1, which is suitably damped by known magnetic damping means comprising a copper loop 101 moving in a magnetic field provided by a permanent magnet (not shown) and which is made light so as to reduce inertia, soon comes to rest, and the strip 19 is immediately gripped by the gripping device 18 and held in the position at which it came to rest. The cam 14 then operates to lift the pin 16 and allow the double-armed lever 5, which until then has been held against the spring pressure of 11 with its arm 7 away from the stop on the weigh-beam, to swing so that its short arm 7 can move into contact with the stop 4. It will be seen that the amount of angular movement of the lever is thus determined by the angular position of the weigh-beam in response to a weighing operation, and thus the plate 9 on the longer arm 6 of the double-armed lever 5 swings to a position which is determined by the weight of the batch of cigarettes just weighed. Since the plate 9 is a greater distance from the pivot centre 8 of the member 5 than is the point on the shorter lever arm 7 which engages the stop 4, the plate moves a relatively large distance in response to a relatively small distance moved by the stop on the weigh-beam, and thus small variations in the weights of the various batches of cigarettes cause comparatively large variations in the position of the plate.

The two feelers 10 are then moved down towards the edge of the plate 9. The feelers 10 are mounted on levers 54 pivoted at 55 and urged downwards by springs 56. They are raised by a rod 57 fixed to levers 58 and 59 joined to form a small frame and also pivoted at 55. The lever 59 is periodically swung about its pivot by a link 60 pivoted to one end of a cam lever 61 which is pivoted at 13. A spring 62 tends to raise the cam lever 61 and a cam 63 engages a roller on one end of the lever. The three cams 14, 30 and 63 shown on a shaft 64 all rotate at the same speed and thus the feelers are lowered in timed relationship with the movements of the gripper 18 and pin 16.

As previously mentioned in the apparatus shown only movements of the arm 6 sufficient to cause it to clear one of the feelers 10 are used to effect alterations in the speed of the tobacco feeding apparatus, and a constant alteration in speed is made each time.

If the batch of cigarettes weighed is of normal weight, or within the tolerance, the two feelers rest on the centre portion of the plate 9. If, on the other hand the batch is, for example, lighter than normal, the plate will be in such a position that one of the feelers moves down and comes into engagement with the plate while the other passes it. This movement of the feeler is used, as will be explained shortly, to actuate automatic regulating devices which cause the rate of feed of the tobacco to be increased by a predetermined amount. The other feeler rests on the centre portion of the plate during this time. If on the other hand the cigarettes are too heavy, the said other feeler moves down and the rate of feed of tobacco is decreased.

The feeler levers 54 have tails 65 in which screws 66 are fitted. Behind the screws are the contacts of two micro-switches 67. When a feeler passes below the level of the plate 9 the screw 66 on the corresponding feeler lever 54 presses the corresponding switch and makes a circuit. From the micro-switches three conductors marked A, B and C, B being common, lead to solenoids shown in Figures 4 and 5, a suitable source of power (not shown) being interposed.

Figure 4:
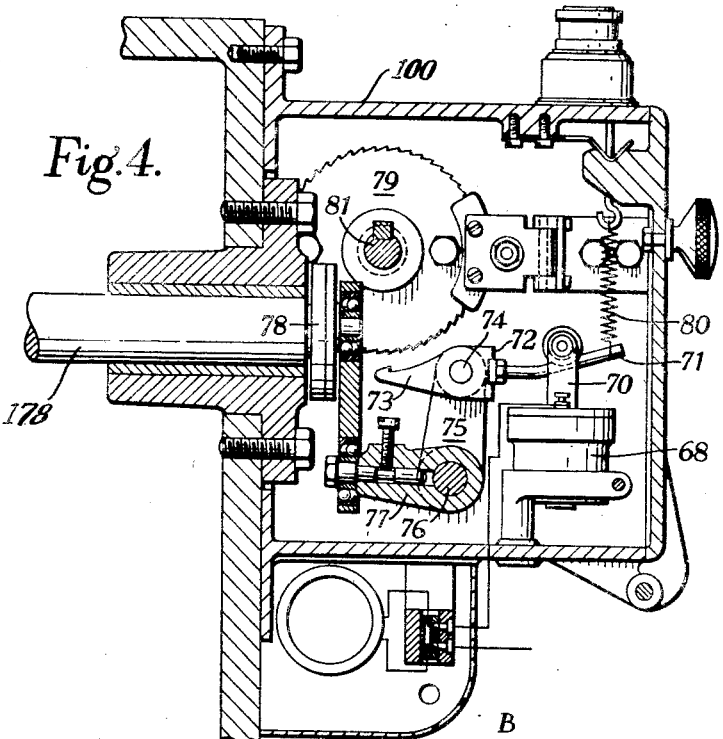
Figure 4 is a sectional elevation of part of a cigarette machine bed showing devices for altering a speed regulating shaft.

The regulating devices and the manner in which they are actuated by the feelers, will now be described with reference to Figures 4 and 5.

Figure 5:
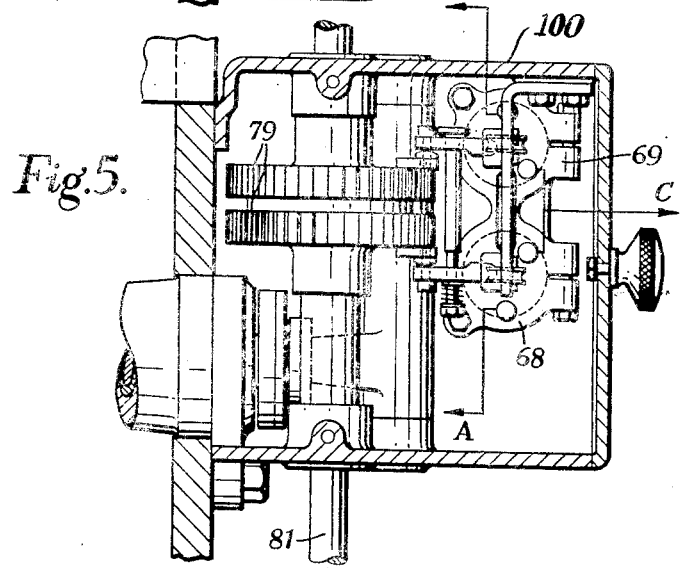
Figure 5 is a sectional plan of Figure 4.

Referring to Figure 5 of the drawings, it will be seen that the conductors A, B and C from the micro-switches 67 of Figure 1 are connected to a pair of solenoids 68 and 69, which together with other parts about to be described are contained in a housing 100.

The plunger 70 of each solenoid is connected to one arm 71 of a lever 72, the other arm of which constitutes a pawl 73. The levers 72 are further connected by bearings formed at the lever pivots 74 to a pivoted lever 75. The pivoted lever 75 is oscillated about its pivot 76 by a link 77 attached to an eccentric 78, mounted on a shaft 178, see Figure 4, which is driven from the main drive of the cigarette making machine.

By means of this eccentric the pawls 73 are constantly vibrated in the neighbourhood of ratchet wheels 79 and when one of the solenoids 68 or 69 is energised, its plunger 70 is pulled downwardly against the action of a spring 80 and causes the corresponding pawl 73 to engage with a ratchet wheel 79. The wheels 79 are arranged so that one causes a shaft 81 to be rotated in one direction whilst the other causes the shaft to be rotated in the reverse direction. The shaft 81 is connected with the control shaft, or the shaft 81 may be the control shaft, of a variable speed gear through which the tobacco feeding apparatus is driven from the main drive of the cigarette machine and when the shaft 81 is rotated in one direction or the other, the tobacco feeding apparatus operates at a faster speed or slower speed according to the direction in which the shaft is rotated.

Rotation of the pan 3 is effected by a lever 82 pivoted at 83 and operated by a lever 84 coupled to a link 85 which is pivoted to the lever 12. Thus as the lever rises to raise the pin 16, the pan wheel is rotated through 90° by engagement of the lever 82 with a pin 86 on the neighbouring spoke of the wheel.

It will be seen that by means of the present invention the inertia of the weight-beam can be considerably reduced and thus each weighing operation can be completed in a relatively short time. This enables the detector means to be brought into operation sooner, and thus the time-lag between the weighing of a batch of cigarettes and the corresponding correction of the rate of feed of tobacco where necessary can be considerably reduced. Moreover, by mounting the plate 9 on a member which is separate from the weigh-beam, the amount of movement by the plate relative to the movement of the weigh-beam can be greatly increased without increasing the inertia of the weigh-beam, since the longer arm of the double-armed lever 5 may be made as long as desired, while at the same time by suitable arrangement of the parts the angular movement of the double-armed lever can be made considerably greater than that of the weight-beam.

What I claim as my invention and desire to secure by Letters Patent is:

1. In weighbeam apparatus for weighing articles in succession and detecting variations in the weights of said articles by determining and amount the weighbeam has deflected from a given position under the weight of an article, the combination with the weighbeam, of a stop on the weighbeam, a pivoted member mounted for pivotal movement about a fixed axis, means for swinging said pivoted member about said axis so as to bring a part of said member into contact with the stop at the end of a weighing operation, at least one feeler movable into engagement with a surface on the pivoted member, and means for moving said feeler toward the said surface when the said part of the pivoted member is in contact with the stop, the extent of movement of the feeler depending on the angular position of the pivoted member whose position depends on the weighbeam deflection.

2. Apparatus as claimed in claim 1, comprising two feelers and means for moving said feelers toward said surface, and wherein when the deflection of the weighbeam is within predetermined limits, the resulting angular position of the pivoted member is such that both said feelers when so moved engage said surface which thereby limits the extent of their movement and wherein when said limits are exceeded, the resulting angular position of the pivoted member is such that when said feelers are so moved only one of said feelers engages said surface while the other feeler moves a greater distance, each of said feelers being capable of independent movement beyond the extent to which it can move when it engages the said surface.

3. Apparatus as claimed in claim 1 wherein the surface of the pivoted member engaged by the feeler is farther from the pivot of said member than the part which engages the weighbeam stop.

4. Apparatus as claimed in claim 1 comprising means for holding the weighbeam against movement when the weighbeam stop is engaged by said pivoted member.

5. Apparatus as claimed in claim 1 comprising means for moving the pivoted member away from the stop and preventing it from moving towards the stop except at desired times.

References Cited in the file of this patent

UNITED STATES PATENTS

| 1,089,680 | Sloan | Mar. 10, 1914 |
| 1,811,759 | Molins | June 13, 1931 |
| 1,908,771 | Lied | May 16, 1933 |
| 1,921,317 | Molins | Aug. 8, 1933 |
| 1,996,189 | Biro | Apr. 2, 1935 |
| 2,002,045 | Ruau | May 21, 1935 |
| 2,083,173 | Ruau | June 8, 1937 |
| 2,102,317 | Gwynn | Dec. 14, 1937 |
| 2,121,191 | Tahir | June 21, 1938 |
| 2,329,975 | Best | Sept. 21, 1943 |
| 2,343,240 | Molins | Mar. 7, 1944 |

FOREIGN PATENTS

| 433,527 | Great Britain | Aug. 15, 1933 |